(12) United States Patent
Catalano et al.

(10) Patent No.: US 9,497,266 B2
(45) Date of Patent: Nov. 15, 2016

(54) DISK MIRRORING FOR PERSONAL STORAGE

(71) Applicant: International Business Machines Corporation, Armonk, NY (US)

(72) Inventors: Pasquale A. Catalano, Newburgh, NY (US); Casimer M. DeCusatis, Poughkeepsie, NY (US); Rajaram B. Krishnamurthy, Wappingers Falls, NY (US); Michael Onghena, Poughquang, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 13/774,318

(22) Filed: Feb. 22, 2013

(65) Prior Publication Data

US 2014/0244777 A1    Aug. 28, 2014

(51) Int. Cl.
G06F 15/167    (2006.01)
H04L 29/08     (2006.01)
H04L 29/14     (2006.01)

(52) U.S. Cl.
CPC ....... H04L 67/1095 (2013.01); H04L 67/1097 (2013.01); H04L 69/40 (2013.01)

(58) Field of Classification Search
CPC .......................... H04L 67/1095; H04L 67/1097
USPC ......................................................... 709/212
See application file for complete search history.

(56) References Cited

U.S. PATENT DOCUMENTS

| | | | | |
|---|---|---|---|---|
| 5,764,903 A * | 6/1998 | Yu | ................................. | 709/208 |
| 6,560,641 B1 * | 5/2003 | Powderly et al. | ............. | 709/219 |
| 6,609,151 B1 * | 8/2003 | Khanna et al. | ................ | 709/222 |
| 6,829,654 B1 * | 12/2004 | Jungck | ........................... | 709/246 |
| 6,985,935 B1 * | 1/2006 | Zhang et al. | .................. | 709/219 |
| 7,177,887 B2 | 2/2007 | Yang et al. | | |
| 7,293,096 B1 * | 11/2007 | Foltak et al. | .................. | 709/228 |
| 7,398,421 B1 * | 7/2008 | Limaye et al. | .................. | 714/18 |
| 7,418,439 B2 | 8/2008 | Wong | | |
| 7,526,459 B2 * | 4/2009 | Flinn | ..................... | G06N 99/005 |
| | | | | 706/12 |
| 7,600,105 B2 * | 10/2009 | Tseng | ................................ | 713/1 |
| 7,627,775 B2 | 12/2009 | Kern et al. | | |
| 7,647,460 B1 * | 1/2010 | Wilson et al. | ................. | 711/162 |
| 8,150,800 B2 | 4/2012 | Webman et al. | | |
| 8,298,087 B1 * | 10/2012 | Smith | ................ | G06Q 30/0255 |
| | | | | 463/42 |

(Continued)

FOREIGN PATENT DOCUMENTS

CA    2 498 958 A1    11/2006
CN    101201767 A    6/2008

Primary Examiner — Kevin Bates
Assistant Examiner — Clarence McCray
(74) Attorney, Agent, or Firm — Steven J. Meyers; Hunter E. Webb; Keohane & D'Alessandro PLLC

(57) ABSTRACT

Embodiments of the present invention provide a system for backing up personal data between two mated (i.e., paired) network attached storage (NAS) devices. The system includes a local storage device and a secondary storage device that communicate over a network (e.g., the Internet) via a network connection. Any data added or modified on the local storage device will be automatically mirrored (i.e., copied) to the secondary storage device, which may be located at a secure remote site, pursuant to a data mirroring technique.

18 Claims, 4 Drawing Sheets

(56) References Cited

U.S. PATENT DOCUMENTS

| | | | |
|---|---|---|---|
| 8,793,334 B1* | 7/2014 | Bathija | 709/217 |
| 8,850,174 B1* | 9/2014 | Mahmoud | G06F 9/4416 709/217 |
| 2002/0078233 A1* | 6/2002 | Biliris et al. | 709/238 |
| 2002/0133539 A1* | 9/2002 | Monday | 709/203 |
| 2002/0194313 A1* | 12/2002 | Brannock | 709/220 |
| 2004/0034617 A1* | 2/2004 | Kaku | G11B 20/18 |
| 2004/0034671 A1* | 2/2004 | Kodama | G06F 9/4416 |
| 2004/0078467 A1* | 4/2004 | Grosner et al. | 709/226 |
| 2004/0078602 A1* | 4/2004 | Rothbarth et al. | 713/201 |
| 2005/0246576 A1* | 11/2005 | Takayama | 714/6 |
| 2005/0278383 A1* | 12/2005 | Kazar et al. | 707/200 |
| 2006/0200539 A1* | 9/2006 | Kappler et al. | 709/220 |
| 2006/0248294 A1* | 11/2006 | Nedved et al. | 711/162 |
| 2006/0253731 A1* | 11/2006 | Petruzzo | 714/6 |
| 2007/0074290 A1* | 3/2007 | Kobayashi | G06F 21/564 726/24 |
| 2007/0088702 A1* | 4/2007 | Fridella et al. | 707/10 |
| 2007/0168713 A1* | 7/2007 | Kern et al. | 714/12 |
| 2007/0282951 A1* | 12/2007 | Selimis et al. | 709/205 |
| 2008/0229098 A1* | 9/2008 | Ishak | 713/156 |
| 2009/0037717 A1* | 2/2009 | Hanes | 713/2 |
| 2009/0062010 A1* | 3/2009 | Iwata | G06Q 30/02 463/42 |
| 2009/0288084 A1* | 11/2009 | Astete et al. | 718/1 |
| 2011/0258248 A1* | 10/2011 | Jackson | 709/202 |
| 2011/0258320 A1* | 10/2011 | Jackson | 709/226 |
| 2012/0044836 A1* | 2/2012 | Sivavakeesar et al. | 370/255 |
| 2012/0084364 A1* | 4/2012 | Sivavakeesar | H04L 12/1818 709/205 |
| 2012/0122592 A1* | 5/2012 | Stafford | A63F 13/67 463/43 |
| 2012/0166578 A1* | 6/2012 | Hong | G06Q 50/01 709/217 |
| 2012/0178536 A1* | 7/2012 | Oh | H04L 12/1822 463/42 |
| 2012/0244948 A1* | 9/2012 | Dhillon | A63F 13/335 463/42 |
| 2012/0265976 A1* | 10/2012 | Spiers et al. | 713/2 |
| 2012/0297158 A1* | 11/2012 | Hua et al. | 711/164 |
| 2013/0007741 A1* | 1/2013 | Britsch et al. | 718/1 |
| 2013/0053118 A1* | 2/2013 | Schueller | G07F 17/3218 463/17 |
| 2013/0159251 A1* | 6/2013 | Skrenta et al. | 707/612 |
| 2013/0297608 A1* | 11/2013 | Etoh | G06F 17/30035 707/737 |
| 2014/0052948 A1* | 2/2014 | Qiu | G06F 9/485 711/162 |
| 2014/0244777 A1* | 8/2014 | Catalano et al. | 709/212 |
| 2014/0250294 A1* | 9/2014 | Ali | G06F 9/4401 713/2 |
| 2014/0298003 A1* | 10/2014 | Ali et al. | 713/2 |
| 2014/0359259 A1* | 12/2014 | Ali et al. | 713/1 |
| 2015/0143064 A1* | 5/2015 | Bhargava et al. | 711/162 |

\* cited by examiner

DISK MIRRORING FOR PERSONAL STORAGE

FIELD OF THE INVENTION

In general, embodiments of the present invention relate to backing up and restoring data on a storage device. Specifically, embodiments of the present invention relate to automatically mirroring added or modified data located on a local storage device to a secondary storage device.

BACKGROUND OF THE INVENTION

Backing up data and personal files (often together referred to as "personal data" herein) from computer storage disks has been a well-known practice for many years. Backup is the activity of copying files or databases so that they will be preserved in case of equipment failure or other catastrophe. Backup is usually a routine part of the operation of large businesses with mainframes, as well as the administration of smaller business computers. For personal computer users, backup is also necessary so that a user does not lose important personal data including family photos, home videos, music libraries, tax information, and the like.

Personal computer users can consider local backup or cloud backup. Two major reasons exist why data needs to be backed up. The first reason is that the disk hardware may fail, resulting in an inability to access any of the valuable data stored on the disk. This disastrous type of event is often referred to as a catastrophic failure. In this case, assuming that backups have been performed, the files may be restored from the most recent backup. Fortunately, new computer disks and controllers have become more reliable over the years, but the possibility of such a disaster still cannot be ignored. The second reason for backup is that a user may inadvertently delete or overwrite important data files. This type of problem is usually much more common than a catastrophic hardware failure, and only the destroyed file(s) are typically restored from the backup medium to the original disk.

Cloud backup, also known as online backup, is a strategy for backing up data that involves sending a copy of the data over the Internet to an off-site server. Cloud storage can bring some significant risks. A user can lose access to the account, data can become corrupted, or the cloud service provider can delete it either by accident or deliberately because the user has not paid the bills. Also, the personal data in a cloud-based backup system might be readable by other people and may be vulnerable to hacking or failures at the cloud service provider.

SUMMARY OF THE INVENTION

Embodiments of the present invention provide a system for backing up personal data between two mated (i.e., paired) network attached storage (NAS) devices. The system includes a local storage device and a secondary storage device that communicate over a network (e.g., the Internet) via a network connection. Any data added or modified on the local storage device will be automatically mirrored (i.e., copied) to the secondary storage device, which may be located at a secure remote site, pursuant to a data mirroring technique.

A first aspect of the present invention provides a data mirroring system, comprising: a first storage device configured to connect to a network, wherein the first storage device is assigned a network address; a second storage device configured to connect to the network, wherein the second storage device is assigned a network address; the first storage device is further configured to retrieve the network address of the second storage device from an information source; and the first storage device is further configured to send data changes made on the first storage device to the second storage device via the network based on the network address of the second storage device.

A second aspect of the present invention provides an intelligent storage device, comprising: a storage area configured to store data; an interface module configured to connect to a network; an intelligence module configured to receive a network address assigned to the intelligent storage device; the intelligence module further configured to retrieve a network address assigned to a secondary storage device from an information source; an intelligence module further configured to send data changes made on the intelligent storage device to the secondary storage device over the network based on the network address of the secondary storage device.

A third aspect of the present invention provides a method for data mirroring, comprising: connecting a first storage device to a network; connecting a second storage device to the network; assigning a network address to the first storage device; assigning a network address to the second storage device; writing the network address of the first storage device to an information resource; writing the network address of the second storage device to an information resource; receiving the network address of the second storage device at the first storage device; and mirroring data changes made on the first storage device to the second storage device via the network based on the network address of the second storage device.

BRIEF DESCRIPTION OF THE DRAWINGS

These and other features of this invention will be more readily understood from the following detailed description of the various aspects of the invention taken in conjunction with the accompanying drawings in which.

Figure 1:
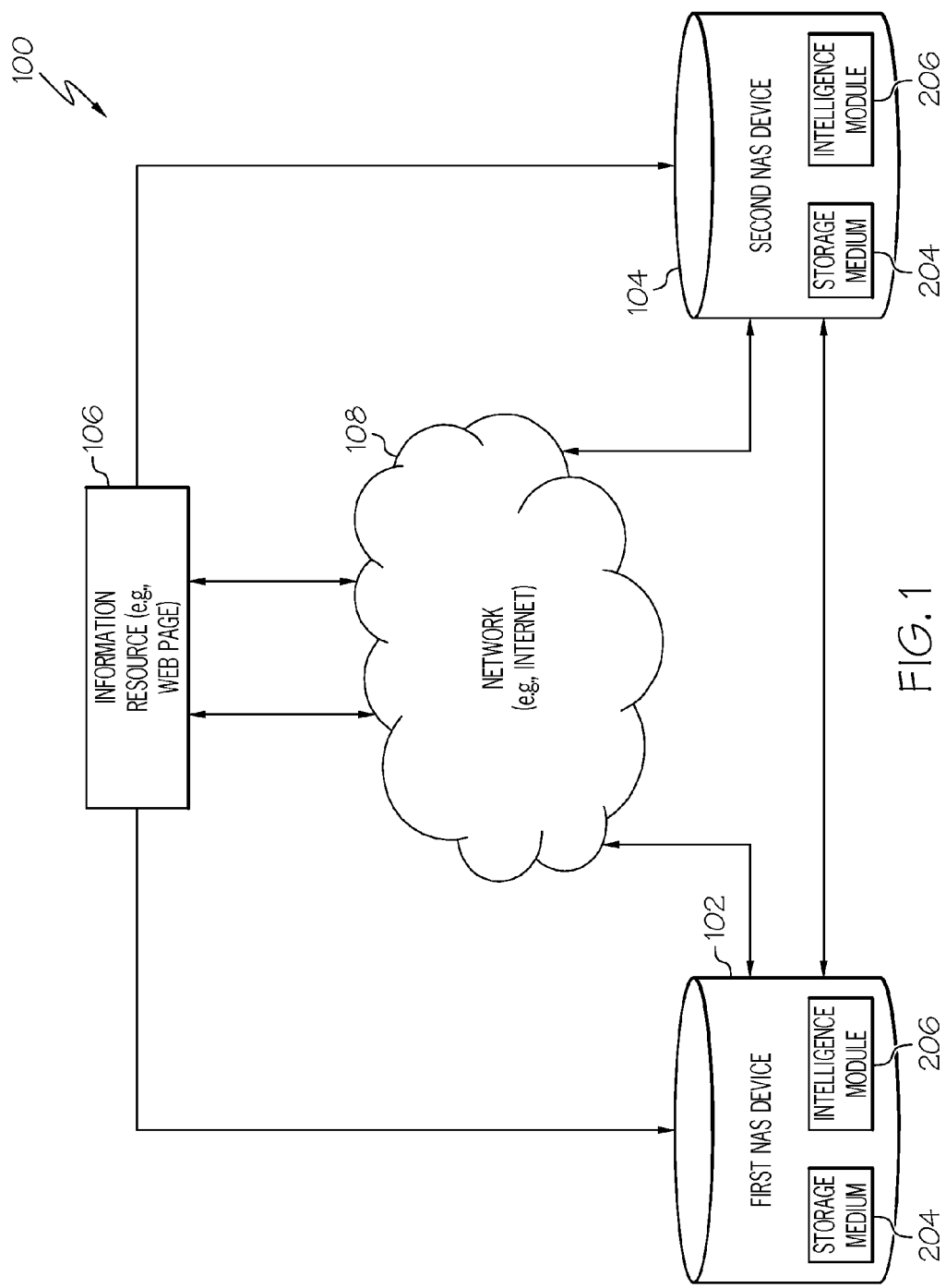
FIG. 1 depicts an example implementation of a data mirroring system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments are described herein with reference to cross-sectional or perspective illustrations that are schematic illustrations of idealized embodiments (and intermediate structures). As such, variations from the shapes of the illustrations as a result, for example, of manufacturing techniques and/or tolerances are to be expected. Thus, embodiments should not be construed as limited to the particular shapes of regions illustrated herein but are to include deviations in shapes that result, for example, from manufacturing. For example, an edge or corner region illustrated as having sharp edges may have somewhat rounded or curved features. Likewise, elements illustrated as circular or spherical may be oval in shape or may have certain straight or flattened portions. Thus, the regions illustrated in the figures are schematic in nature, and their shapes are not intended to illustrate the actual shape of a region or element of a device and are not intended to limit the scope of the disclosed embodiments.

Unless otherwise defined, all terms (including technical and scientific terms) used herein have the same meaning as commonly understood by one of ordinary skill in the art to which this inventive concept belongs. It will be further understood that terms such as those defined in commonly used dictionaries should be interpreted as having a meaning that is consistent with their meaning in the context of the relevant art and will not be interpreted in an idealized or overly formal sense unless expressly so defined herein.

The storage of electronic data has evolved over time. During the early development of the computer, storage of electronic data was limited to individual computers. Electronic data was stored in the Random Access Memory (RAM) or some other storage medium such as a magnetic tape or hard drive that was a part of the computer itself.

Later, with the advent of network computing, the storage of electronic data gradually migrated from the individual computer to stand-alone storage devices accessible via a network. These individual network storage devices soon evolved into networked tape drives, optical libraries, Redundant Arrays of Inexpensive Disks (RAID), CD-ROM jukeboxes, and other devices. Common architectures also include network attached storage devices (NAS devices) that are coupled to a particular network (or networks) that are used to provide dedicated storage for various storage operations that may be required by a particular network (e.g., backup operations, archiving, and other storage operations including the management and retrieval of such information).

Users of typical computer systems commonly maintain quantities of highly important personal data (e.g., photos, videos, music, financial information) and expend time and money to protect the data against unavailability resulting from unintentional or unexpected loss. One technique for maintaining redundant data copies is termed data mirroring, in which computer system users maintain at least two copies of valuable data. In one example, one copy of the data is maintained locally and a second copy of the data is maintained at a remote location.

Embodiments of the present invention provide a system for backing up personal data between two mated (i.e., paired) network attached storage (NAS) devices. The system includes a local storage device and a secondary storage device that communicate over a network (e.g., the Internet) via a network connection. Any data added or modified on the local storage device will be automatically mirrored (i.e., copied) to the secondary storage device, which may be located at a secure remote site, pursuant to a data mirroring technique.

FIG. 1 depicts an example implementation 100 of the data mirroring system according to an embodiment of the present invention. Implementation 100 includes a first NAS device 102, a second NAS device 104, an information resource 106 (e.g., a web page), and a network (e.g., the Internet) 108. The first NAS device 102 and second NAS device 104 each include a storage medium 204 and an intelligence module 206, described in more detail below with reference to FIG. 2.

Network 108 may include any type or combination of local area network (LAN), a wide area network (WAN), an Intranet, the Internet, or the like. Also, each NAS device may be coupled to the network 108 using any type of wired or wireless connection medium. For example, wired mediums may include Ethernet, fiber channel, a modem connected to plain old telephone service (POTS), and the like. Wireless connection mediums may include a satellite link, a modem link through a cellular service, a wireless link such as Wi-Fi™, a wireless connection using a wireless communication protocol such as IEEE 802.11 (wireless Ethernet), Bluetooth, and the like.

In a typical communication network, a computing device (e.g., a server or a personal computer) is capable of connecting to one or more devices (e.g., storage devices, printers, displays, projectors, cameras, etc.). Accordingly, in one example, the first NAS device 102 may receive read and write access requests from a computing device, such as a personal computer. In another example, the second NAS device 104 may also receive read and write access requests from a computing device.

Information resource 106 may be any document or other information resource that can be accessed by the storage devices. In one example, the information resource 106 is an external Internet web page.

Figure 2:
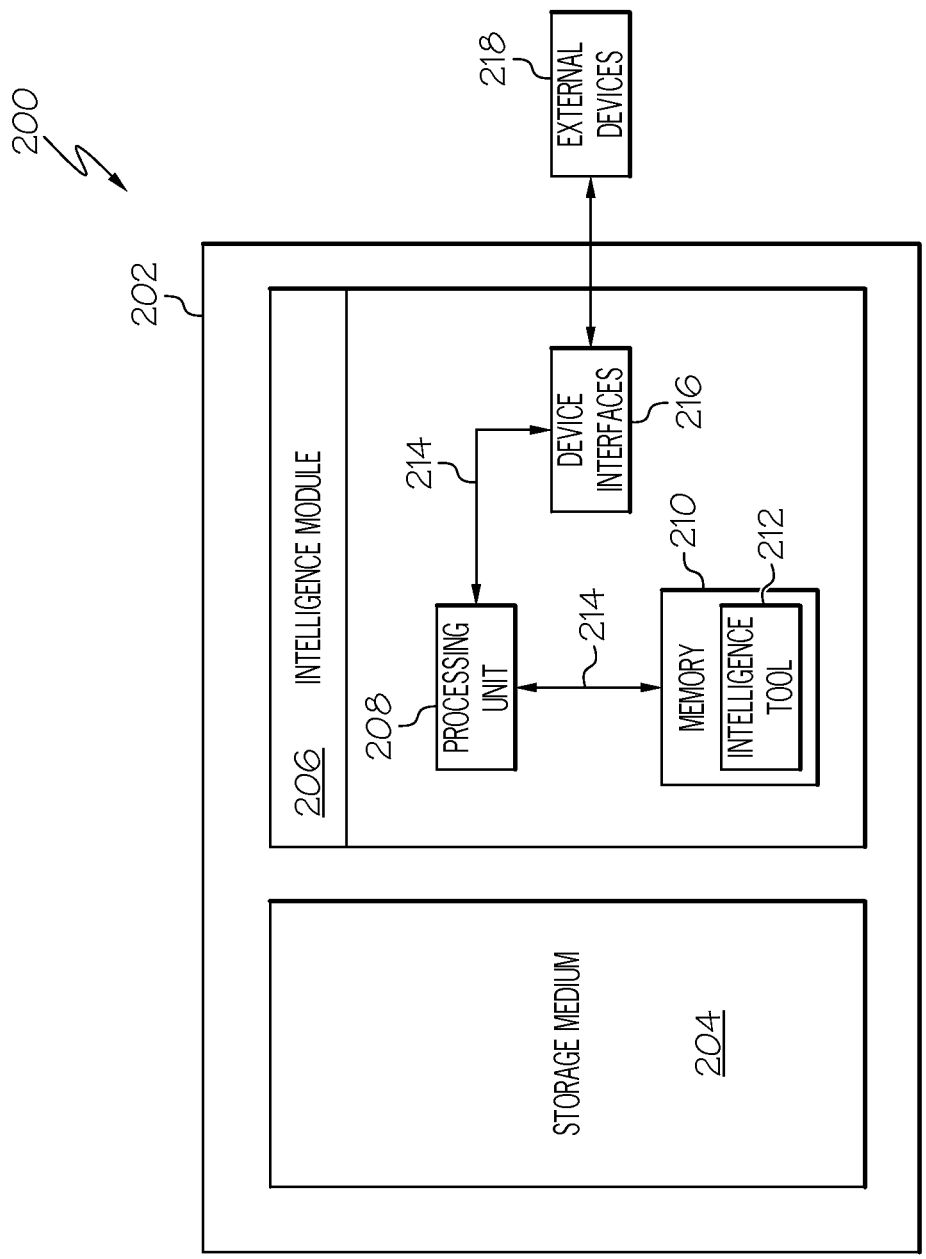
FIG. 2 depicts an example implementation of a storage device for performing intelligent data mirroring according to an embodiment of the present invention.

FIG. 2 depicts an example implementation 200 of a storage device for performing intelligent data mirroring according to an embodiment of the present invention. Implementation 200 depicts intelligent storage device 202 including storage medium 204 and intelligence module 206. The intelligent storage device 202 may store data onto the storage medium 204, such as a hard disk or other storage medium that conforms to specifications for disk-based storage devices common in the industry. As shown, the intelligence module 206 may include processing unit 208, memory 210 for storing intelligence tool 212, a bus 214, and device interfaces 216.

Processing unit 208 collects and routes signals representing outputs from external devices 218 (e.g., a keyboard, a pointing device, a display, a graphical user interface, etc.) to intelligence tool 212. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 208 executes computer program code, such as program code for intelligence tool 212, which is stored in memory 210. While executing computer program code, processing unit 208 can read and/or write data to/from memory 210. Although not shown, intelligent storage device 202 could also include I/O interfaces that communicate with one or more external devices 218 that enable a user to interact with intelligent storage device 202.

The intelligence module 206 performs various intelligent functions described in detail below. The term "module" may be defined to include one or more executable modules. As described herein, the modules are defined to include software, hardware, or some combination thereof executable by a processor or processing device. Software modules may include instructions stored in the storage device that are executable by the processor or processing device. Hardware modules may include various devices, components, circuits, gates, circuit boards, and the like, that are executable, directed, and/or controlled for performance by the processor or processing device In the example set forth below with reference to FIG. 3, it will be assumed that the first NAS device 102 is a local storage device and the second NAS device 104 is a remote (or secondary) storage device which acts as a backup of the first NAS device 102. However, in a typical embodiment, the local NAS device 302 contains the necessary intelligence described in detail below to synchronize data changes performed on the local NAS device 302 with the remote NAS device 304. The local NAS device 302 and remote NAS device 304 are intelligent storage devices capable of performing intelligent data mirroring functions according to various embodiments of the present invention.

Figure 3:
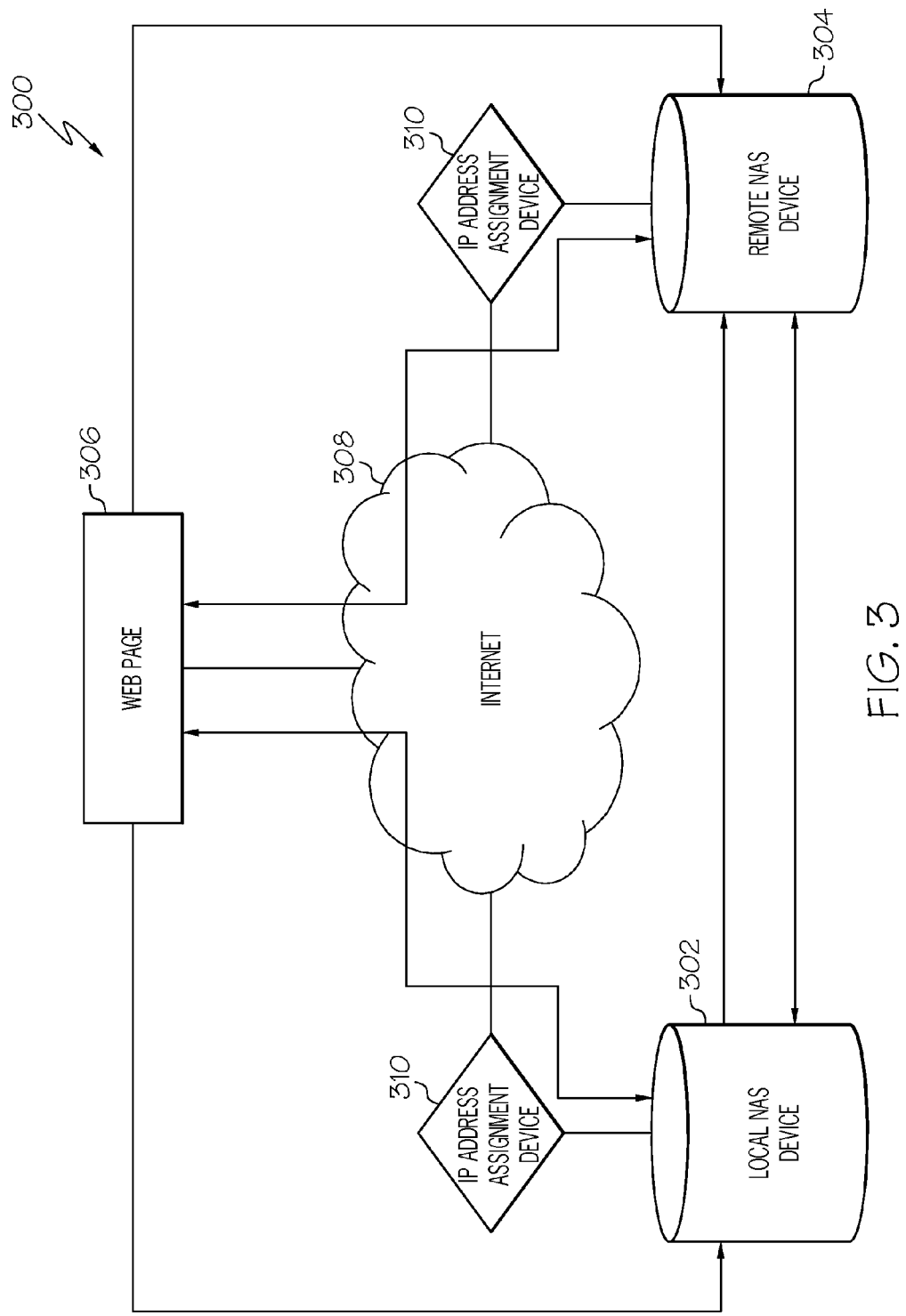
FIG. 3 depicts a more detailed example implementation of a data mirroring system according to an embodiment of the present invention.

FIG. 3 depicts a more detailed example implementation 300 of the data mirroring system according to an embodiment of the present invention. The local NAS device 302 and remote NAS device 304 are connected to the Internet 308, either wired or wirelessly. An Internet protocol (IP) address is assigned to each storage device by IP address assignment device 310. IP address assignment device 310 may include a gateway router, cable modem, Internet Service Provider device, or the like that is capable of assigning a unique IP address to each storage device. An IP address is a numerical label assigned to each device (e.g., computer, printer, storage device) participating in a computer network that uses the Internet Protocol for communication. An IP address serves two principal functions: host or network interface identification and location addressing. In one example, the IP addresses are assigned via Dynamic Host Configuration Protocol (DHCP). DHCP is a network protocol that enables a server to automatically assign an IP address to a computer device from a defined range of numbers (i.e., a scope) configured for a given network.

The local NAS device 302 contains the uniform resource locator (URL) of the web page 306. The URL of the web page 306 may be located in a modified basic input-output system (BIOS) of the each of the storage devices. An intelligence module (not shown) of the local NAS device 302 receives the URL of the web page 306, logs in to the web page 106, and writes its IP address to the web page 306. Similarly, an intelligence module (not shown) of the remote NAS device 304 receives the URL of the web page 306, logs in to the web page 106, and writes its IP address to the web page 306.

The local NAS device 302 reads the IP address of the secondary NAS device 304 from the web page 306. The local NAS device 102 sends (i.e., synchronizes) data updates performed on the local NAS device 102 to the remote NAS device 304 using the IP address of the remote NAS device 304 that was read. Data changes may include any information related to a combination of data addition(s), data update(s), and data delete(s) made to data stored on the local storage device.

Data changes may be mirrored synchronously or asynchronously. In one example, data changes are mirrored synchronously. Synchronous mirroring writes to both the primary and second NAS devices at the same time. With the synchronous option, the transaction is not complete until it is echoed to the second NAS device. Asynchronous mirroring allows the first NAS device to be updated immediately and the second NAS device to be updated as bandwidth allows. The information is cached and sent later, as network resources become available.

With the asynchronous option, data change synchronization is complete if it is echoed within a specified time frame. In the event of a failed Internet connection, the data on the remote NAS device 304 after the failure timestamp is untrusted. When the link fails and is restored, buffers on both ends of the link are flushed, and a recovery process is initiated from the last trusted timestamp. The NAS devices back up one another to prevent data loss in case of one device failing. A non-paired storage device (due to mate failing or no connection) can be used as a single drive. Any changes to non-paired devices may be mirrored when an Internet connection is provided.

Figure 4:
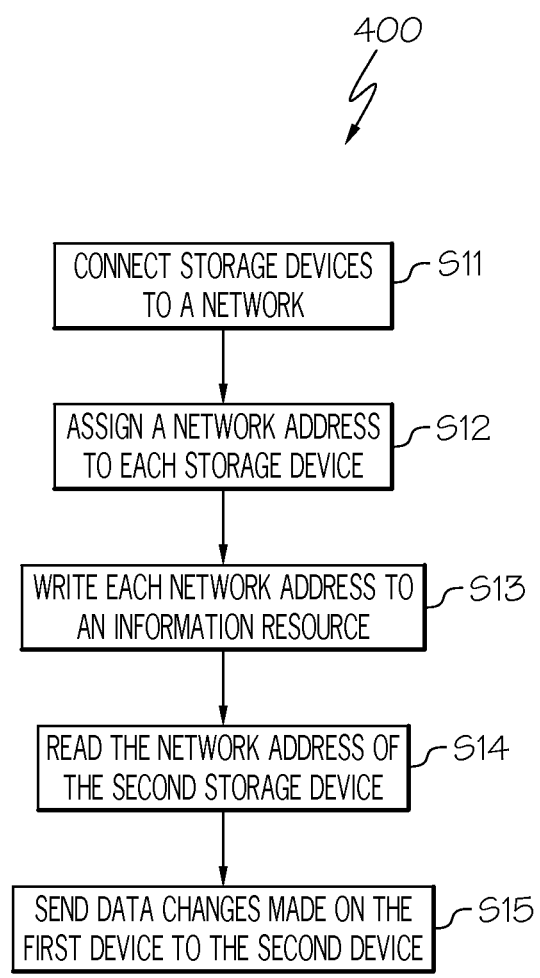
FIG. 4 depicts an example method flow diagram for providing a data mirroring process according to an embodiment of the present invention.

FIG. 4 depicts a method flow diagram 400 for providing a data mirroring process according to an embodiment of the present invention. The present invention provide a data mirroring system for backing up personal data between a pair of mated network-attached hard drives after successful completion of a self-discovery process. At S11, each intelligent storage device is connected to a network 108 (e.g., the Internet). At S12, a network address is assigned to each storage device. At S13, each storage device writes its network address to an information resource 106 (e.g., an external web page). At S14, the first storage device 102 reads the network address of the second storage device 104. At S15, the first storage device 102 sends data changes made on the first storage device 102 to the second storage device 104 for data synchronization.

It should be noted that, in the process flow chart of FIG. 4 described herein, some steps can be added, some steps may be omitted, the order of the steps may be re-arranged, and/or some steps may be performed simultaneously.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A data mirroring system, comprising:
a first storage device configured to connect to a network, wherein the first storage device is assigned a network address;
a second storage device configured to connect to the network, wherein the second storage device is assigned a network address;
the first storage device being further configured to receive a uniform resource locator (URL) of an information source that is stored in a modified basic input-output system (BIOS) of the first storage device from the BIOS of the first storage device and write the IP address of the first storage device to the information source based on the URL;
the first storage device being further configured to retrieve the network address of the second storage device from the information source; and
the first storage device being further configured to send data changes made on the first storage device to the second storage device via the network based on the network address of the second storage device.

2. The data mirroring system of claim 1, wherein the first storage device is remotely located from the second storage device.

3. The data mirroring system of claim 1, wherein the network is the Internet, the network address is an Internet protocol (IP) address, and the information source is a web page.

4. The data mirroring system of claim 3, wherein a time of the first storage device and a time of the second storage device are synchronized using Network Time Protocol (NTP) via an Internet connection.

5. The data mirroring system of claim 4, wherein the first storage device is further configured to determine when the first network connection fails, determine a recovery point based on a time of the first network connection failure, and send data updates made on the first storage device to the second storage device based on when a network connection becomes available.

6. The data mirroring system of claim 1, wherein the second storage device is further configured to retrieve the network address of the first storage device and send data updates made on the second storage device to the first storage device via the network based on the network address of the first storage device.

7. An intelligent storage device, comprising:
a storage area configured to store data;
an interface module configured to receive a uniform resource locator (URL) of an information source that is stored in a modified basic input-output system (BIOS) of the first storage device from the BIOS of the first storage device and to connect to a network by writing an IP address of the first storage device to the information source based on the URL;
an intelligence module configured to receive a network address assigned to the intelligent storage device;
the intelligence module being further configured to retrieve a network address assigned to a secondary storage device from the information source; and
the intelligence module being further configured to send data changes made on the intelligent storage device to the secondary storage device over the network based on the network address of the secondary storage device.

8. The intelligent storage device of claim 7, wherein the intelligent storage device is remotely located from the secondary storage device.

9. The intelligent storage device of claim 7, wherein the network is the Internet, the network address is an Internet protocol (IP) address, and the information source is a web page.

10. The intelligent storage device of claim 9, wherein a time of the intelligent storage device and a time of the secondary storage device are synchronized using Network Time Protocol (NTP) via an Internet connection.

11. The intelligent storage device of claim 10, wherein the intelligence module is further configured to determine when the network is unavailable, determine a recovery point based on a time when the network is unavailable, and send data updates made on the intelligent storage device to the second storage device based on when a network connection becomes available.

12. The intelligent storage device of claim 7, wherein the secondary storage device is further configured to retrieve the network address of the intelligent storage device and send data updates made on the secondary storage device to the intelligent storage device via the network based on the network address of the intelligent storage device.

13. A method for data mirroring, comprising:
receiving receive a uniform resource locator (URL) of an information source that is stored in a modified basic input-output system (BIOS) of the first storage device from the BIOS of the first storage device;
connecting the first storage device to a network;
connecting a second storage device to the network;
assigning a network address to the first storage device;
assigning a network address to the second storage device;
writing the network address of the first storage device to an information resource;
writing the network address of the second storage device to an information resource;
receiving the network address of the second storage device at the first storage device; and
mirroring data changes made on the first storage device to the second storage device via the network based on the network address of the second storage device.

14. The method of claim 13, wherein the first storage device is remotely located from the second storage device.

15. The method of claim 13, wherein the network is the Internet, the network address is an Internet protocol (IP) address, and the information resource is a web page.

16. The method of claim 15, wherein a time of the first storage device and a time of the second storage device are synchronized using Network Time Protocol (NTP) over the Internet.

17. The method of claim 16, wherein the local storage device is further configured to determine when the first network connection fails; the local storage device is further configured to determine a recovery point based on a time of the first network connection failure; the local storage device synchronize data between the local storage device and the secondary storage device after the first network connection is made using the time of the first network connection failure.

18. The method of claim 13, further comprising:
receiving the IP address of the first storage device at the second storage device; and mirroring data updates made on the second storage device to the first storage device via the network based on the network address of the first storage device.

* * * * *